Patented May 21, 1946

2,400,477

UNITED STATES PATENT OFFICE 2,400,477

PROCESS OF FORMING POLYMERS OF ALKYL ACRYLATE AND RESULTING PRODUCT

Francis Clarke Atwood, Newton, Mass., assignor, by mesne assignments, to National Dairy Products Corporation, New York, N. Y., a corporation of Delaware No Drawing. Application October 14, 1942, Serial No. 462,049

16 Claims. (Cl. 260—83)

This invention relates to the polymerization of alkyl acrylates, and relates more particularly to methods of polymerizing alkyl acrylates to form polymers of desirable characteristics, and the resulting product.

The polymerization reaction of alkyl acrylates may be represented substantially as follows:

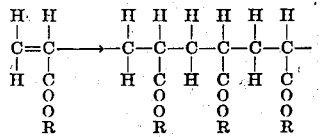

in which R is an alkyl group such as the methyl, ethyl, propyl, butyl or lauryl group. This reaction essentially involves the breaking of the double bond in the alkyl acrylate molecules and the formation of a chain of alkyl acrylate molecules by connection of these molecules through the free bond.

The invention relates to such a polymerization reaction by a novel method as described hereinafter for producing a product having particularly desirable properties.

An object of the present invention is to provide methods of polymerizing alkyl acrylates to produce almost quantitative yields of polymers.

Another object of the invention is to provide methods of polymerizing alkyl acrylates to produce polymers of predetermined desired characteristics.

A further object of the invention is to provide a method of producing polymers of alkyl acrylates comparable to crude rubber in many of their physical characteristics, which are substantially free of the monomer and the di-, tri- and tetramers.

An additional object of the invention is to provide a method which produces a polymer of the desired average molecular weight and the desired distribution of different molecular weight polymers.

Another object of my invention is the provision of a method which is capable of control to produce repeated quantities of an identical polymer.

A further object of the invention is to provide a method which in its control can be varied readily so as to produce polymer products of different characteristics.

Other objects of the invention will become apparent from the description of typical methods embodying the present invention set forth hereinafter.

In accordance with the present invention, polymerization of alkyl acrylates is conducted under such conditions that intimate contact is maintained between the previously formed polymers and the reactive monomers, thereby assuring the most satisfactory conditions for conversion of the monomer into the polymer and the carrying forward of the polymerization to the desired point.

More particularly, polymerization of an alkyl acrylate is carried out by reaction between previously formed polymer and an excess of monomer, in the absence of water and under conditions of agitation and heating such that the monomer is dispersed throughout the polymer and thus is maintained under optimum conditions for combination of the molecules into chains of desired lengths.

In the formation of the polymers of alkyl acrylates, I find that sufficient alkyl acrylate should be present to combine to form chains and to continue to increase the length of the chains or form new chains. This requirement can be satisfied when there is an excess of the monomer and when the conditions during the reaction are such as to promote the formation and growth of the chains.

The agitation of previously formed polymer with an excess of the monomer provides the proper distribution and contact of the monomer with the polymer, thereby assuring the intimate contact between the chains and molecules required in polymerization.

The polymerization of alkyl acrylates preferably is carried out above room temperature and near although below the boiling point of material in the mixing chamber so that the temperature of polymerization may be controlled. The monomer or mixture with polymer should be held for a substantial period of time which may be called the induction period, during which time new chains are initiated slowly and in relatively small amounts so that an excessive rate of polymerization is avoided. Too great or uncontrolled speed will result in resinous like masses. Temperatures above the boiling point of the alkyl acrylate may be used, but polymerization at these temperatures must be carried out under pressure and thus may be dangerous.

The polymerization of alkyl acrylates can be catalyzed by the addition of any persalt or peroxide such as, for example, hydrogen peroxide, benzoyl peroxide or sodium perborate. These catalysts may be used in the present method in initiating or in completing the reaction after it has proceeded to partial completion in order to expedite the formation of a polymer of the desired characteristics.

In a preferred form of the method, methyl acrylate and a mass of the polymer thereof are placed in an agitating device such as, for example, a Banbury mixer, a Werner-Pfleiderer mixer or other similar device having agitating blades or paddles therein and a cover in which is mounted a reflux condenser and a thermometer. The mass of the polymer corresponds to approximately 10% to less than 50% of the weight of the monomer. The mixture is agitated and heated to about the boiling point of the monomer. Any volatilized monomer is condensed in the reflux condenser and is returned to the receptacle.

Thorough agitation of the mixture while heating, results in the quick formation of a viscous mass or liquid consisting of methyl acrylate monomer dispersed in and bound to the polymer so that it distills only with great difficulty. As the monomer is converted into polymer, an additional quantity of the monomer is added so that an excess of the monomer is maintained in the reaction chamber in admixture with the polymer. The monomer may be added either continuously or intermittently. By "excess" is meant more of the monomer than the polymer.

The monomer should be added at such a rate that the ratio between the polymer and the monomer remains as near the same as is practical. Thus, if there are 25 pounds of polymer and 50 pounds of monomer present at the beginning of the reaction, when 50 pounds of the polymer has been formed, 100 pounds of the monomer should be present. The excess that is provided must be in relation to the capacity of the mixer and near the end of the operation the ratio may be altered if desired.

After the desired amount of polymer is formed, generally when the mixer is full, the feed of fresh methyl acrylate to the reaction chamber is discontinued, and the mass is "finished off," i. e. the remaining monomer is polymerized as far as possible while agitation is continued. The temperature in the reaction chamber during this finishing may be raised to about 150° C. This final heating operation causes the production of polymers of more uniform characteristics and of better elasticity than polymers which are formed at lower temperatures. Moreover, the increased temperature causes the reaction to be carried forward to completion so that the lower molecular weight polymers and the monomer are reacted to the desired extent. In this way most of the monomer can be polymerized and the completion can be recognized when no more reflux is returned from the condenser. At the conclusion of this treatment, a soft rubbery polymer is formed which does not have the characteristic odor of methyl acrylate.

Thus it will be apparent that during the formation of the major portion of the polymer, i. e. that formed prior to the finishing off, and possibly even during the first part of this operation, the monomer in admixture with the polymer is maintained in excess. It is only at the end that the last portion of the monomer is polymerized in an excess of the polymer. Even polymerization of this last portion could be avoided if the remaining monomer were removed by distillation, but this is not economically desirable nor is it necessary to obtain the advantages of my novel method.

I have found that polymerization can be controlled in various ways to produce polymers of different characteristics. The rate and the extent of the reaction are functions of the temperature, light conditions, mechanical shock and agitation, the amount of catalyst present and the amount of monomer in relation to polymer. Moreover, these various factors are related and exert their combined influence on the molecular weight of the polymers and the speed of the reaction of the polymers. For example, the speed of the reaction and the length of the molecular chains are dependent to a large extent upon the temperature of the reaction mixture. At lower temperatures, the reaction proceeds more slowly, while at the boiling point of the monomer, the reaction proceeds more rapidly even in the absence of a catalyst. Usually, little or no catalyst is necessary at relatively high reaction temperatures for a soft type of polymer, and a relatively larger amount of catalyst is used at lower temperatures or when a faster reaction is desired.

I have discovered also that the length of the chain of the polymer as well as the speed can be varied by controlling the amount of catalyst present. Shorter chain and softer polymers are obtained by using very small quantities of catalyst. The amount may be as high as 1%. Best results in the formation of soft, rubbery polymers have been obtained when less than 0.1% of a catalyst is used. Very satisfactory rubbery polymers have been prepared using only .002% of the catalyst and even when no catalyst is present in the initial stages of the reaction.

In order to prepare soft polymers it is desirable to operate at relatively low temperatures, i. e., below the boiling point of the monomer and with little or no catalyst present, until a substantial amount of polymer is formed. Thereafter, a small amount, less than 0.1%, of catalyst may be added. In a preferred embodiment the catalyst is added with the last of the monomer to be introduced following which the temperature is raised and the batch is finished off to drive out the excess monomer. When a stiffer product is desired, a catalyst is added at the beginning of the reaction and a different temperature is used. If the amount of catalyst is to be present in a given relation to the entire mass throughout the operation, the catalyst may be added to the supply of monomer in the desired percentage and the mixture introduced in the reaction chamber. I have found it desirable to carry on most of the polymerization at less than 75° C. and above 65° C.

It will be understood that different temperatures may be used and that the temperature employed may be varied or may be constant throughout the polymerization period. The amount of catalyst present may be varied considerably depending upon the type of polymer to be produced and may be constant in amount or may be varied during different parts of the reaction.

Strong agitation of the reaction mixture appears to produce polymers of lower molecular weight or lower viscosity while less violent agitation promotes the formation of longer chains and high viscosity and insolubility.

The rate of polymerization and the extent of polymerization can be controlled by varying the temperature in the reaction chamber as has been mentioned above. The polymerization can be stopped or substantially so by cooling the reaction mixture at any point and for any period in the operation and thus, by alternately heating and cooling, a close control may be had.

The flexibility of my process permits the production of polymers or mixtures of polymers which have widely varying characteristics. Moreover, the proportions of polymers of different molecular weights may be controlled to provide products having superior characteristics for various usages. For example, if it is desirable to produce a product that mills well and holds pigments, the product must contain a substantial proportion of polymers of relatively high viscosity as well as have the desired average molecular weight. If a stiffer product is desired, the reaction conditions should be such as to produce a high proportion of long chain polymers in the product.

The resulting product appears to contain or tests as 20 to 30% of polymers of a molecular weight under 25,000, 40 to 60% of polymers having molecular weight between 25,000 and 75,000, and 20 to 30% of polymers of a molecular weight from 75,000 to 100,000. In some instances the molecular weights of the compounds may run as high as 150,000.

It will be clear that the products resulting from my processes may be reacted to very high molecular weights; for example, masses of the polymer which appear to be well polymerized may be reacted further to increase their molecular weight and their viscosity or rigidity by heating with infra-red rays.

By a similar method ethyl acrylate, or a mixture of a methyl acrylate with ethyl acrylate or other alkyl acrylate may be polymerized. Copolymers of acrylates with other compounds containing unsaturated linkages may also be formed by the same process. I have found a mixture of equal proportions of ethyl and methyl acrylates to give a mass which is highly desirable for many purposes, particularly for automobile tires.

The polymers made in accordance with the above described process have elastic and plastic properties suiting them for many uses. They are capable of being milled and molded. If desired, they may be cured or thermo-set to eliminate plastic flow by a chemical reaction establishing cross links between the polymer chains, preferably a reaction utilizing the alkyl groups. Such a reaction may be accomplished by esterification, transesterification or saponification with organic di-basic compounds such as alcohols or esters or with polyvalent inorganic compounds such as hydrated lime and calcium chloride, with or without excess moisture. When using the inorganic compounds in particular, it is desirable to have present a substantial amount of water to facilitate the reaction. This may be incorporated by milling the cross linking compound in solution into the rubber prior to the molding and curing operation.

Using polymers made in the above described manner and properly cured, it has been possible to recap tires running as high as 2000 miles per $\frac{1}{16}$ of an inch wear. It has also been found that such polymer may be compounded with gas black or so-called hard carbon, which is a substantial economic advantage. Furthermore, another economic factor is the ability of polymers produced for motor car tires to meet a specification which calls for the use of from 25–50% carbon introduced as a pigment without excessive or undue heating during use, without chipping and cracking under shock and to withstand, without cracking, shock at temperatures below 0° F. or even lower temperatures. Such polymers will make rubber-like products when cured by means shown in copending cases with elongations of 500–600%.

From the foregoing description of typical methods of polymerizing alkyl acrylates, it will be clear that I have provided methods of producing polymers of controlled characteristics in a simple and efficient manner. By suitable control of the conditions under which the reaction takes place, I can produce soft polymers having many of the characteristics of crude rubber or harder and stiffer products suitable for many purposes that hard rubber or other synthetic resins are commonly used. Therefore, it will be understood that the example given above is illustrative only, and should not be considered as limiting the scope of the claims herein.

I claim:

1. A method of polymerizing alkyl acrylates which comprises agitating under polymerizing conditions a mixture of an alkyl acrylate monomer and a polymer of said alkyl acrylate in a mass, said mixture containing an excess of the monomer, and adding additional monomer thereto to maintain said excess during at least part of the polymerization.

2. A method of polymerizing alkyl acrylates which comprises agitating under polymerizing conditions a mixture of an alkyl acrylate monomer and a polymer of said alkyl acrylate in a mass at a temperature above room temperature, said mixture containing an excess of the monomer, and adding additional monomer thereto to maintain said excess during at least part of the polymerization.

3. A method of polymerizing alkyl acrylates which comprises agitating under polymerizing conditions a mixture of an alkyl acrylate monomer and a polymer of said alkyl acrylate in a mass at a temperature about the boiling point of the monomer, said mixture containing an excess of the monomer, and adding additional monomer thereto to maintain said excess during at least part of the polymerization.

4. A method of polymerizing alkyl acrylates which comprises agitating an excess of an alkyl acrylate in a mass monomer with a polymer of said alkyl acrylate to dispense said monomer through said polymer and adding additional monomer to maintain an excess of said monomer in contact with said polymer during polymerization.

5. A method of polymerizing alkyl acrylates comprising agitating an excess of an alkyl acrylate monomer with a minor proportion of a polymer of said alkyl acrylate in a mass in a receptacle while heating to about the boiling point of said monomer, and maintaining an excess of said monomer in said receptacle at least during the formation of at least a part of the polymer.

6. A method of polymerizing alkyl acrylates which comprises agitating under polymerizing conditions a mixture of an alkyl acrylate monomer and a polymer of said alkyl acrylate in a mass at a temperature above room temperature but not substantially above the boiling point of the said monomer, said mixture containing an excess of the monomer, and adding additional monomer thereto to maintain said excess during at least part of the polymerization.

7. A method of polymerizing alkyl acrylates which comprises agitating under polymerizing conditions a mixture of an alkyl acrylate monomer and a polymer of said alkyl acrylate in a mass at a temperature above room temperature but not substantially above the boiling point of the said monomer, said mixture containing an excess of the monomer, and adding additional monomer thereto to maintain said excess in about the ratio of monomer to polymer initially present during at least part of the polymerization.

8. A method of polymerizing alkyl acrylates which comprises agitating under polymerizing conditions a mixture of an alkyl acrylate monomer and a polymer of said alkyl acrylate in a mass at a temperature above room temperature but not substantially above the boiling point of the said monomer, said mixture containing an excess of the monomer, and adding additional monomer thereto to maintain said excess during at least part of the polymerization, discontinuing addition of said monomer and heating the reaction mass to substantially complete the polymerization of the excess monomer.

9. A method of polymerizing alkyl acrylates which comprises agitating under polymerizing conditions a mixture of an alkyl acrylate monomer and a polymer of said alkyl acrylate in a mass at a temperature above room temperature but not substantially above the boiling point of the said monomer, said mixture containing an excess of the monomer, and adding additional monomer thereto to maintain said excess during at least part of the polymerization, discontinuing addition of said monomer and heating the reaction mass in the presence of a catalyst to substantially complete the polymerization of the excess monomer.

10. A method of polymerizing alkyl acrylates which comprises agitating under polymerizing conditions a mixture of an alkyl acrylate monomer and a polymer of said alkyl acrylate in a mass at a temperature above room temperature but not substantially above the boiling point of the said monomer, said mixture containing an excess of the monomer, and adding additional monomer thereto to maintain said excess in about the ratio of monomer to polymer initially present during at least part of the polymerization, discontinuing addition of said monomer and heating the reaction mass to substantially complete the polymerization of the excess monomer.

11. A method of polymerizing alkyl acrylates which comprises agitating under polymerizing conditions a mixture of an alkyl acrylate monomer and a polymer of said alkyl acrylate in a mass at a temperature above room temperature but not substantially above the boiling point of the said monomer, said mixture containing an excess of the monomer, and adding additional monomer thereto to maintain said excess during at least part of the polymerization, discontinuing addition of said monomer when a viscous mass has been formed, continuing agitating and heating said mixture to substantially polymerize the excess monomer.

12. A method of polymerizing alkyl acrylates which comprises agitating under polymerizing conditions a mixture of an alkyl acrylate monomer and a polymer of said alkyl acrylate in a mass at a temperature above room temperature but not substantially above the boiling point of the said monomer, said mixture containing an excess of the monomer, and adding additional monomer thereto to maintain said excess during at least part of the polymerization, discontinuing addition of said monomer and increasing the temperature of the reaction mass to substantially complete the polymerization of the excess monomer.

13. A method of polymerizing methyl acrylate to form a soft plastic and elastic polymer, which comprises agitating monomeric methyl acrylate in admixture with 10% to less than 50% of polymethyl acrylate based on the amount of the monomeric methyl acrylate in a mass, heating said mixture during agitating under reflux to prevent loss of monomeric methyl acrylate, adding to the mixture additional amounts of monomeric methyl acrylate at a rate at least as fast as the rate at which the methyl acrylate monomer is polymerized into the polymer.

14. A method of polymerizing methyl acrylate to form a soft plastic and elastic polymer, which comprises agitating monomeric methyl acrylate in admixture with 10% to less than 50% of polymethyl acrylate based on the amount of the monomeric methyl acrylate in a mass, heating said mixture during agitating under reflux to prevent loss of monomeric methyl acrylate, adding to the mixture additional amounts of monomeric methyl acrylate at a rate at least as fast as the rate at which the methyl acrylate monomer is polymerized into the polymer, discontinuing the addition of monomeric methyl acrylate, and maintaining the agitation and heating under reflux until substantially all of the monomeric methyl acrylate has been polymerized.

15. A method of polymerizing methyl acrylate to form a soft plastic and elastic polymer, which comprises agitating monomeric methyl acrylate in admixture with 10% to less than 50% of polymethyl acrylate based on the amount of the monomeric methyl acrylate in a mass, heating said mixture during agitating under reflux to prevent loss of monomeric methyl acrylate, adding to the mixture additional amounts of monomeric methyl acrylate at a rate at least as fast as the rate at which the methyl acrylate monomer is polymerized into the polymer, adding a catalyst to the mixture when at least a part of the polymer has been formed by the above recited steps, discontinuing the addition of monomeric methyl acrylate, and maintaining the agitation and heating under reflux until substantially all of the monomeric methyl acrylate has been polymerized.

16. A method of polymerizing methyl acrylate to form a soft plastic and elastic polymer, which comprises agitating monomeric methyl acrylate in admixture with 10% to less than 50% of polymethyl acrylate based on the amount of the monomeric methyl acrylate in a mass, heating said mixture during agitating to the boiling point of the monomeric methyl acrylate but under reflux to prevent loss of monomeric methyl acrylate, continuously adding to the mixture additional amounts of monomeric methyl acrylate during the agitating and heating and at a rate at least as fast as the rate at which the methyl acrylate monomer is polymerized into the polymer, adding a benzoyl peroxide catalyst to the mixture when at least a part of the polymer has been formed by the above recited steps, discontinuing the addition of monomeric methyl acrylate, and maintaining the agitation and heating under reflux until substantially all of the monomeric methyl acrylate has been polymerized.

FRANCIS CLARKE ATWOOD.

Certificate of Correction

Patent No. 2,400,477.

May 21, 1946.

FRANCIS CLARKE ATWOOD

It is hereby certified that errors appear in the printed specification of the above numbered patent requiring correction as follows: Page 3, second column, line 43, claim 4, strike out "in a mass" and insert the same after "acrylate" in line 44, same claim; same line and claim for "dispense" read *disperse*; in the Grant, line 7, for "PRODOCTS" read *PRODUCTS*; and that the said Letters Patent should be read with these corrections therein that the same may conform to the record of the case in the Patent Office.

Signed and sealed this 3rd day of September, A. D. 1946.

[SEAL]

LESLIE FRAZER,
*First Assistant Commissioner of Patents.*